(12) United States Patent
Xu et al.

(10) Patent No.: US 9,742,222 B1
(45) Date of Patent: Aug. 22, 2017

(54) WIRELESS POWER TRANSFER METHOD AND SYSTEM

(71) Applicant: Wardenclyffe LLC, Eden Prairie, MN (US)

(72) Inventors: Hao Xu, Los Angeles, CA (US); Hao Wu, Los Angeles, CA (US); Ruogu Wang, Eden Prairie, MN (US)

( * ) Notice: Subject to any disclaimer, the term of this patent is extended or adjusted under 35 U.S.C. 154(b) by 0 days.

(21) Appl. No.: 15/422,386

(22) Filed: Feb. 1, 2017

(51) Int. Cl.
*H02J 50/12* (2016.01)
*H02J 7/02* (2016.01)
*H02J 50/40* (2016.01)

(52) U.S. Cl.
CPC .............. *H02J 50/12* (2016.02); *H02J 7/025* (2013.01); *H02J 50/40* (2016.02)

(58) Field of Classification Search
CPC ............. H02J 5/005; H02J 7/025; H02J 17/00
See application file for complete search history.

(56) References Cited

U.S. PATENT DOCUMENTS

| | | | | |
|---|---|---|---|---|
| 2012/0169137 A1* | 7/2012 | Lisi | ........................ | H02J 5/005 307/104 |
| 2012/0170337 A1* | 7/2012 | Lisi | ........................ | H02J 5/005 363/126 |
| 2012/0262004 A1* | 10/2012 | Cook | .................... | H01Q 1/2225 307/104 |
| 2013/0082535 A1* | 4/2013 | Miyauchi | ............. | H04B 5/0093 307/104 |
| 2014/0028093 A1* | 1/2014 | Aikawa | ................... | H02J 7/025 307/11 |
| 2014/0273835 A1* | 9/2014 | Ghovanloo | .......... | H04B 5/0037 455/41.1 |
| 2016/0164303 A1* | 6/2016 | Ku | .......................... | H02J 5/005 307/104 |
| 2016/0352154 A1* | 12/2016 | Matsui | .................... | H02J 7/025 |
| 2017/0005528 A1* | 1/2017 | Oodachi | ................. | H02J 50/40 |

OTHER PUBLICATIONS

Y. Lyu, F. Meng, G. Yang, B. Che, Q. Wu, L. Sun, D. Erni, J. L. Li, "A Method of Using Nonidentical Resonant Coils for Frequency Splitting Elimination in Wireless Power Transfer", Jan. 6, 2015, IEEE, IEEE Transactions on Power Electronics, vol. 30, Issue 11, Nov. 2015, p. 6097-6107.*
D. Ahn, S. Hong, "Effect of Coupling Between Multiple Transmitters or Multiple Receivers on Wireless Power Transfer", Apr. 30, 2012, IEEE, IEEE Transactions on Industrial Electronics, vol. 60, Issue 7, Jul. 2013, p. 2602-2613.*
Y. Zhang, Z. Zhao, K. Chen, "Frequency-Splitting Analysis of Four-Coil Resonant Wireless Power Transfer", Dec. 12, 2013, IEEE, IEEE Transactions on Industry Applications, vol. 50, Issue 4, Jul.-Aug. 2014, p. 2436-2445.*

* cited by examiner

*Primary Examiner* — Rexford Barnie
*Assistant Examiner* — David Shiao
(74) *Attorney, Agent, or Firm* — Jigang Jin

(57) ABSTRACT

A new resonance-based wireless power transfer system is disclosed. The new resonance-based wireless power transfer system includes a power transmitter and a power receiver. The power transmitter and the power receiver are both oscillator-based circuits, but unlike prior systems, their resonant frequencies are different. The difference between the transmitter's resonant frequency and the receiver's resonant frequency is set between a lower bound and an upper bound to ensure that the new resonance-based wireless power transfer system will have only one oscillation frequency while maintaining high power transfer efficiency over varied distances.

16 Claims, 8 Drawing Sheets

WIRELESS POWER TRANSFER METHOD AND SYSTEM

FIELD OF INVENTION

This invention relates to wireless power transfer technology. Particularly, the invention relates to using resonant inductive coupling technology for wirelessly transferring electrical power.

BACKGROUND OF THE INVENTION

Inductive charging uses an electromagnetic field to transfer energy between two objects through electromagnetic induction. Energy is sent through an inductive coupling to an electrical device, which can then use that energy to charge batteries or run the device. Induction chargers use a primary induction coil to create an alternating electromagnetic field from within a charging base, and a secondary induction coil in a portable device takes power from the electromagnetic field and converts it back into electric current to charge the battery. However, this technology requires that the two coils be positioned close to each other to reduce transfer losses. As such, it restricts the distance between the charging base and the portable device. For example, in the application of wirelessly charging a smartphone, the smartphone must be left on a charging base, and thus cannot be moved around or easily operated while charging.

Resonant inductive coupling is the near field wireless transmission of electrical energy between two magnetically coupled coils that are part of resonant circuits tuned to resonate at the same frequency. A resonant circuit, also called LC circuit or tank circuit, is an electric circuit including an inductor (also known as coil) and a capacitor. FIG. 1 illustrates a typical example of such a resonance-based wireless power transfer system. As shown, the power transmitter includes a power source 101, a resister 102, a capacitor 103, and a transmitter coil 104. Here, the capacitor 103 and the transmitter coil 104 form a parallel circuit (also known as parallel LC circuit). The power receiver includes a receiver coil 105, a capacitor 106, and a resistor 107, and the capacitor 106 and the receiver coil 105 are connected in parallel as well. During operation, the two coils 104 and 105 form an inductive link, through which electrical energy is wirelessly transmitted from the transmitter to the receiver. FIG. 2 illustrates another example of a resonance-based wireless power transfer system, where the power transmitter's capacitor 202 and coil 204 are connected serially (also known as serial LC circuit) and same are the power receiver's coil 205 and capacitor 206.

Prior resonance-based wireless power transfer systems were limited to a fixed distance and orientation, with efficiency falling off rapidly when the distance and/or orientation between the transmitter coil and receiver coil (such as the ones shown in FIG. 1 or FIG. 2) change from their optimal operating point. Some resonance-based wireless power transfer systems use adaptive frequency tuning method to overcome the above problems. For example, US Patent Publication No. 20090284220 discloses a wireless power transfer system whose transmitter and receiver are tuned to resonate at the same frequency. In addition, the transmitter and the receiver each contain additional control circuit to tune its own frequency when it detects a "mismatch." This solution, however, introduces additional circuits, which not only consume extra power but also make the transmitter and receiver bulky.

Resonance-based wireless power transfer systems have also been designed to have the power transmitter and receiver resonating at the same frequency so that greater distance between the transmitter and receiver may be achieved. For example, "Wireless Power Transfer via Strongly Coupled Magnetic Resonances," Andre Kurs, et al., SCIENCE, VOL 317, pp 83-85, 6 Jul. 2007 discloses that it is essential that the transmitter and receiver be resonating at the same frequency, and otherwise the efficiency of power transmission will drop sharply. Similarly, a research paper by UCLA (available at http://escholarship.org/uc/item/5fz2p58z#page-1) discloses a wireless power transfer mechanism which can achieve stable power delivery over distance variation and high power transfer efficiency. The paper suggests that to achieve maximum power transfer the transmitter and the receiver must have the same resonant frequency. Thus, prior resonance-based wireless power transfer systems emphasize on the condition that the transmitter circuit and the receiver circuit resonate at the same frequency.

However, it is difficult to accurately control an LC circuit's resonant frequency in mass production because an LC circuit's resonant frequency depends on the inductance of the coil in the circuit and the inductance of a coil depends on various factors, such as the number of turns, separation of the turns, the geometrical size of each turn, the geometrical shape of the coil, and the magnetic permeability of nearby materials. Thus, to make sure each power transmitter or receiver resonates at a particular frequency, extensive testing and fine tuning are required during manufacturing. This complicated testing and tuning process increases production cost and decreases production yield. Furthermore, because a coil's inductance may be affected by its operating environment (e.g., the magnetic permeability of nearby materials) a power transmitter or receiver may resonate at a frequency different from its original resonant frequency when manufactured.

In addition, even if a power transmitter and a power receiver have the same resonant frequency $f_0$, they may reach to one of three different stable oscillating states when coupled together: (1) oscillating at their original resonant frequency $f_0$, (2) oscillating at a frequency $f_1$, that is slightly lower than $f_0$, or (3) oscillating at a frequency $f_H$ that is slightly higher than $f_0$. It is difficult to predict and control which one of the three oscillating states the transmitter and receiver will reach to when they become coupled or when the distance between them changes. And at frequency $f_0$, both the energy transfer efficiency and range degrade significantly.

Thus, a new wireless power transfer system that can overcome the above shortcomings of prior wireless power transfer systems is desired.

SUMMARY OF THE INVENTION

A new resonance-based wireless power transfer system is disclosed. The new resonance-based wireless power transfer system includes a power transmitter and a power receiver, both of which are oscillator-based circuits. Different from prior resonance-based wireless power transfer systems, the present invention requires that the difference between the transmitter's resonant frequency and the receiver's resonant frequency (hereinafter the "frequency offset") be large enough to avoid the multi-oscillation-state situation and yet small enough to allow mutual resonance to happen between the transmitter and receiver, therefore maximizing the energy transfer efficiency and range. In one embodiment of the present invention, the frequency offset is set between a lower bound and an upper bound to ensure that the coupled system will have only one oscillation frequency while maintaining high power transfer efficiency over varied distances.

In one embodiment of the present invention, the receiver further includes a rectifier converting AC voltage to a DC voltage and a DC to DC converter providing a stable voltage to the power load.

In another embodiment of the present invention, a transmitter's coil is shaped to fit in the space where it is installed; and a receiver's coil is shaped to be compatible with the shape of a device (e.g., smartphone, mobile robot). Such shapes may include, but are not limited to, rectangle, circle, square, and hexagon. Also, the transmitter's coil may be substantially larger than the receiver's coil to allow the receiver and the device to which it is attached to move freely within acceptable range (horizontally and/or vertically) while charging.

In another embodiment of the present invention, a transmitter is configured to support multiple receivers simultaneously. Specifically, the transmitter's coil is designed to couple with multiple receivers' coils at the same time.

In yet another embodiment of the present invention, a plurality of transmitters is arranged to cover a large area (e.g., a warehouse floor) with their magnetic fluxes, and a receiver installed on a mobile robot, for example, can move freely within that area while continuously being charged by one of the transmitters.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
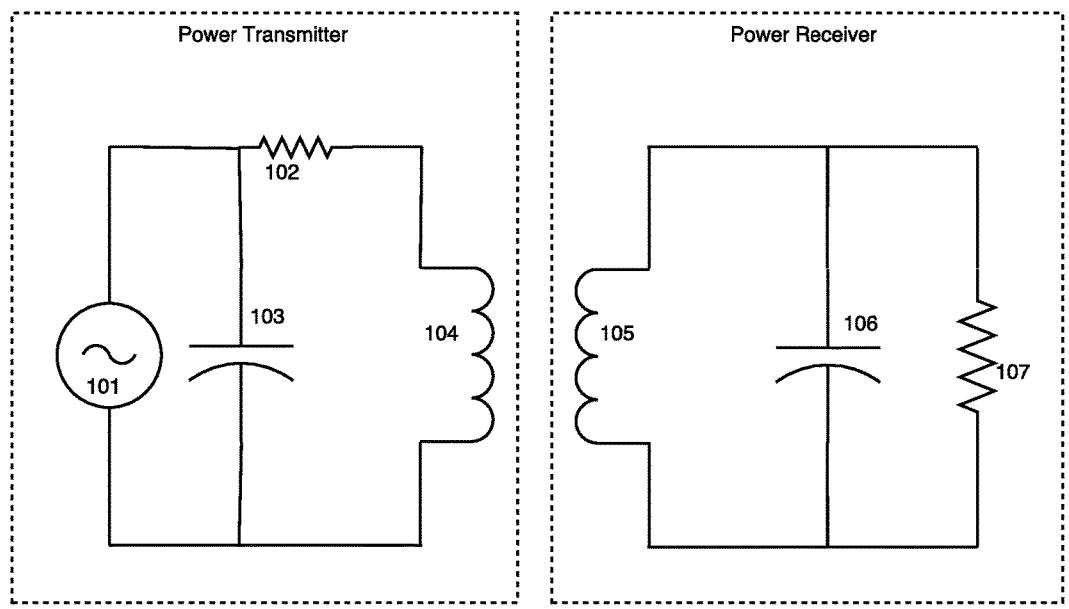
FIG. 1 illustrates a prior art resonance-based wireless power transfer system.
Figure 2:
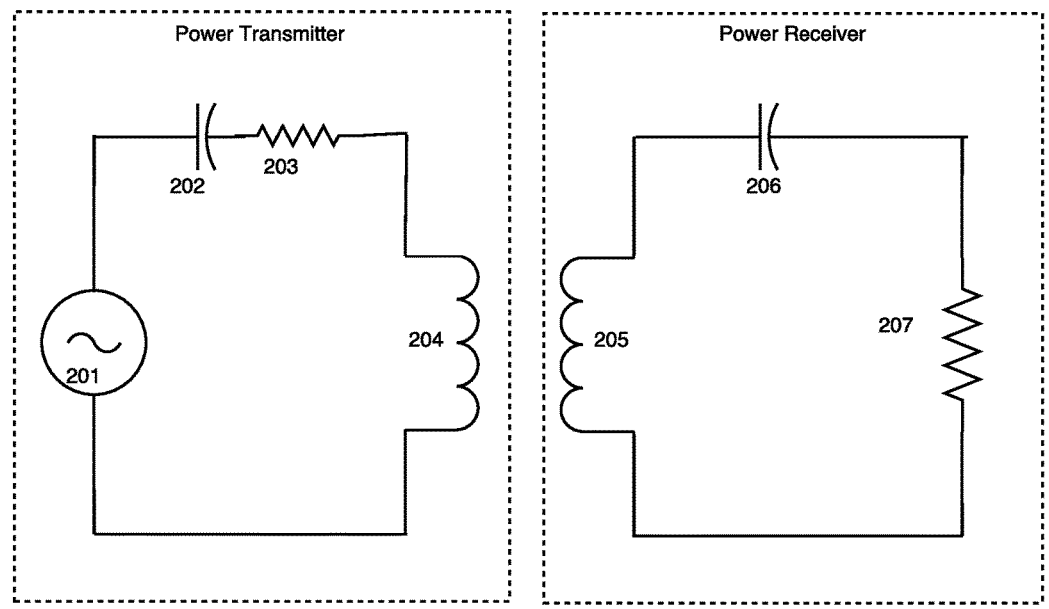
FIG. 2 illustrates a prior art resonance-based wireless power transfer system.
Figure 3:
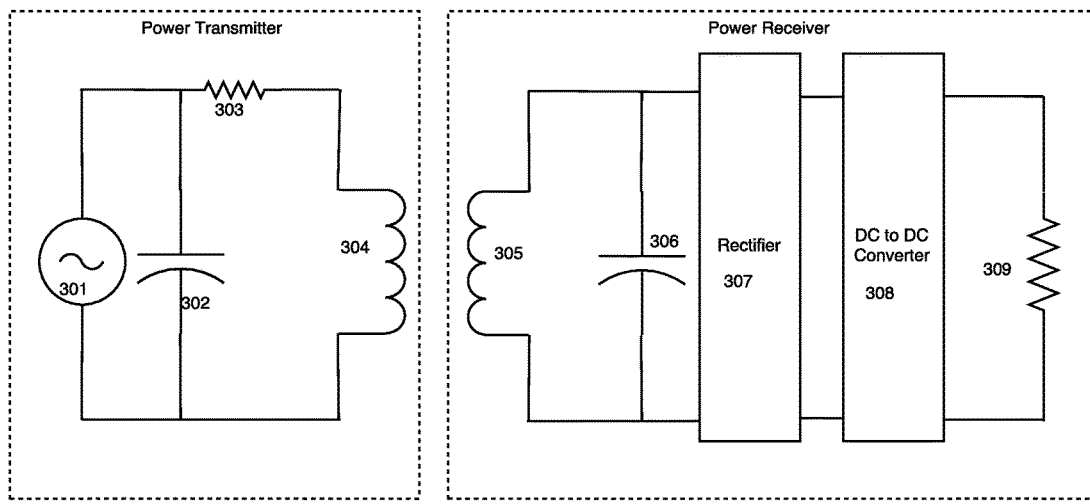
FIG. 3 is a circuit diagram of an example of the resonance-based wireless power transfer system, in accordance with one embodiment of the present invention.

FIG. 3 is a circuit diagram of an example of the resonance-based wireless power transfer system, in accordance with one embodiment of the present invention. As shown, the resonance-based wireless power transfer system 300 includes a power transmitter and a power receiver. The power transmitter, which works as a charging base, includes a power source 301, a capacitor 302, a coil 304, and a resister 303. Together, the capacitor 302, the coil 304, and the resister 303 form a resonant circuit. In this case, the capacitor 302 and the coil 304 are connected in parallel to form a parallel resonant circuit. Alternatively, they may be connected serially to form a serial resonant circuit, such as the power transmitter shown in FIG. 4. The power source 301 may be an Alternating Current (AC) power source, such as the standard United States 120V and 60 Hz AC electricity supply, or a Direct Current (DC) power source, such as a battery. In one embodiment, the power source is not part of the transmitter. As such, the transmitter may be made into a portable device compatible with various types of power sources. The power receiver includes a coil 305, a capacitor 306, a rectifier 307, a DC to DC converter 308, and a power load 309. In this case, the coil 305 and the capacitor 306 form a parallel resonant circuit. Alternatively, they may form a serial resonant circuit, such as the power receiver shown in FIG. 4. In one embodiment, the power load 309 is a mobile device (e.g., smartphone, mobile robot), a vehicle (e.g., electric car), or a battery and other components of the power receiver are integrated with the power load 309. Alternatively, the power load 309 is not part of the power receiver. As such, the power receiver may be made into a portable device compatible with various types of power loads.

Figure 4:
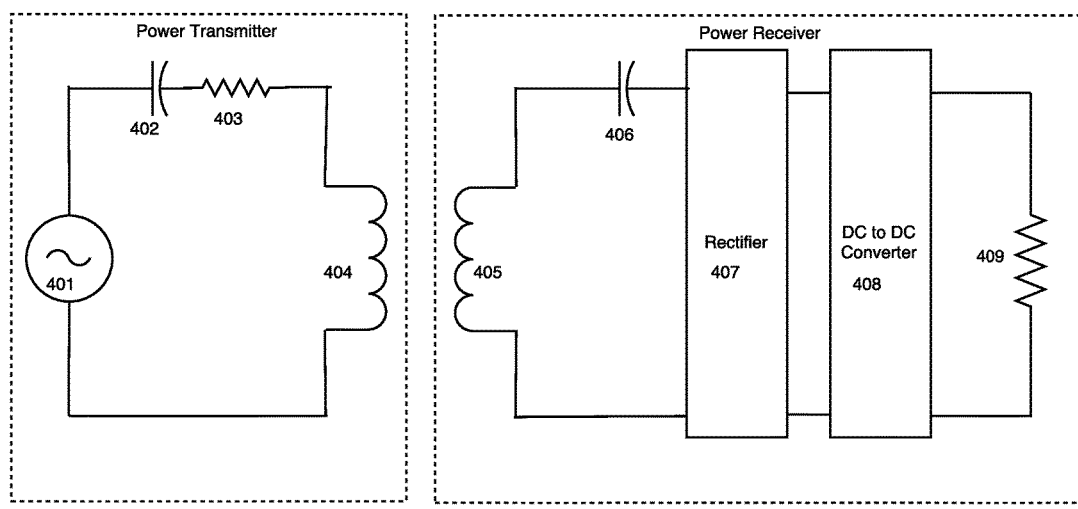
FIG. 4 is a circuit diagram of another example of the resonance-based wireless power transfer system, in accordance with one embodiment of the present invention.
Figure 5A:
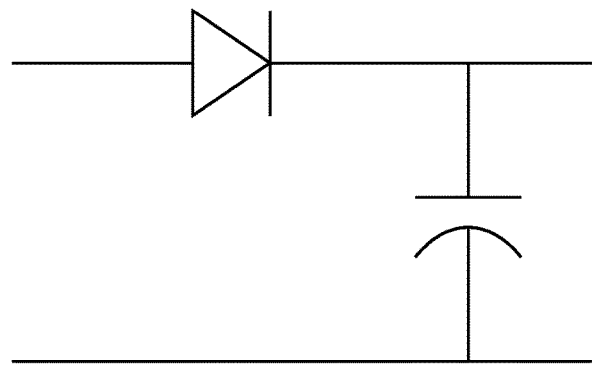
FIG. 5A is a circuit diagram of an example of the rectifier shown in FIGS. 3 and 4.
Figure 5B:
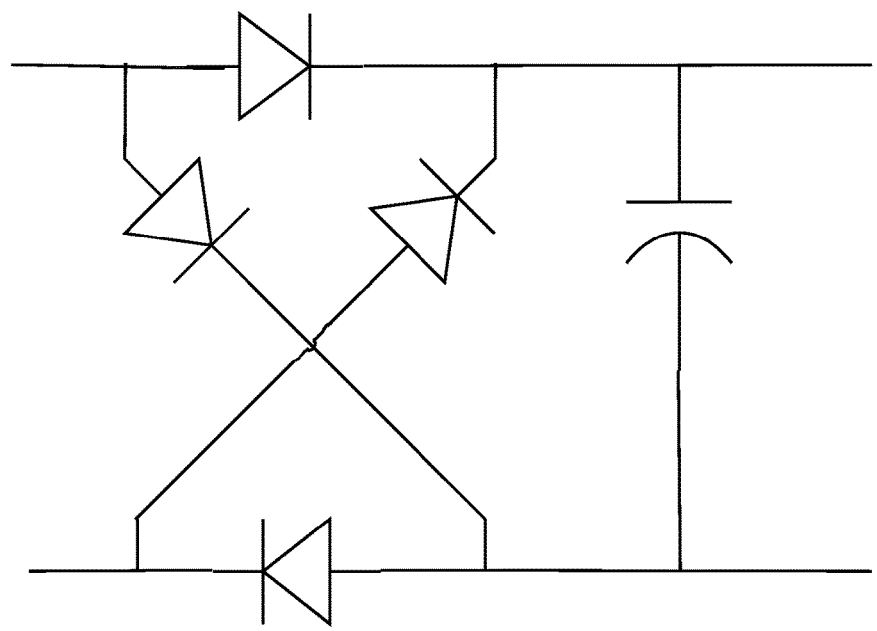
FIG. 5B is a circuit diagram of another example of the rectifier shown in FIGS. 3 and 4.
Figure 6:
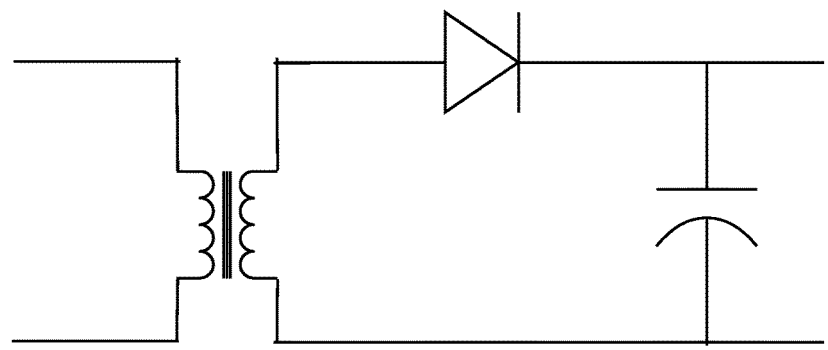
FIG. 6 is a circuit diagram of an example of the DC to DC converter shown in FIGS. 3 and 4.

During operation, the transmitter's coil 304 and the receiver's coil 305 form an inductive link through which magnetic flux is harvested and converted into AC current. The rectifier 307 converts the AC current into DC current by allowing the current to flow through it in one direction only. FIG. 5A shows an example of such a rectifier, and FIG. 5B shows another example of such a rectifier. The DC to DC converter 308 then converts and stabilizes the voltage level and provides it to the power load 309. FIG. 6 shows an example of such a DC to DC converter, which can reduce the voltage level for a power load. Alternatively, in the configuration shown in FIG. 4, the rectifier 407 and the DC to DC converter 408 may be replaced with an AC to DC converter, which can increase the voltage level, or a voltage multiplier of N diodes and N capacitors, which is discussed below with reference to FIG. 7.

Large quality factors on both the power transmitter side and the power receiver side can improve the power transmission efficiency. Because a power transmitter includes or is connected to a power source, its quality factor is large. However, a power receiver is not directly connected to any power source, and therefore its quality factor largely depends on the characteristic of the circuit itself. In a parallel resonant circuit, such as the power receiver in FIG. 3, the larger the resistance of the power load 309 is, the higher the receiver's quality factor is. Thus, in one embodiment, if the resistance of the power load 309 is too small, the DC to DC converter 308 reduces the voltage level for the power load 309 to increase its effective resistance in the receiver circuit, therefore increasing the quality factor of the receiver circuit in FIG. 3. In a serial resonant circuit, such as the power receiver in FIG. 4, the smaller the resistance of the power load 409 is, the higher the receiver's quality factor is. Thus, in one embodiment, if the resistance of the power load 409 is too large, the rectifier 407 and the DC to DC converter 408 may be replaced with an AC to DC converter, which increases the voltage level for the power load 409 to decrease its effective resistance in the receiver circuit, therefore increasing the quality factor of the receiver circuit in FIG. 4.

Figure 13:
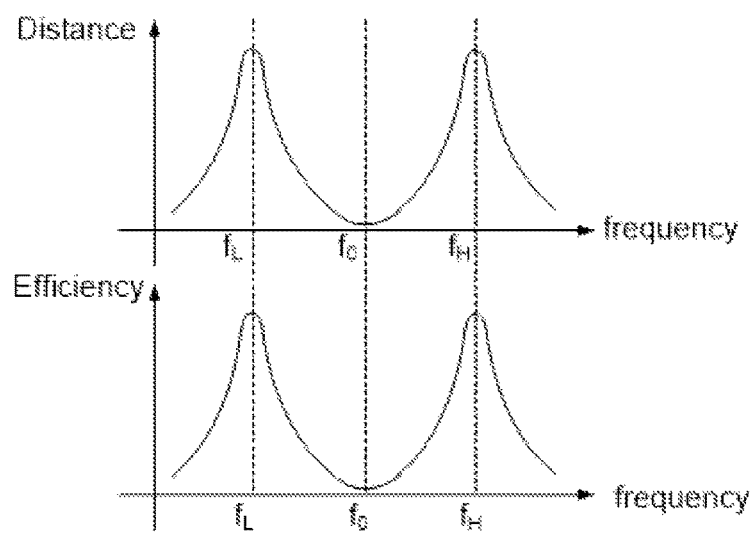
FIG. 13 illustrates the scenario where coupled resonant circuits with the same resonant frequency produce three different stable oscillation states in a resonance-based wireless power transfer system.
Figure 14:
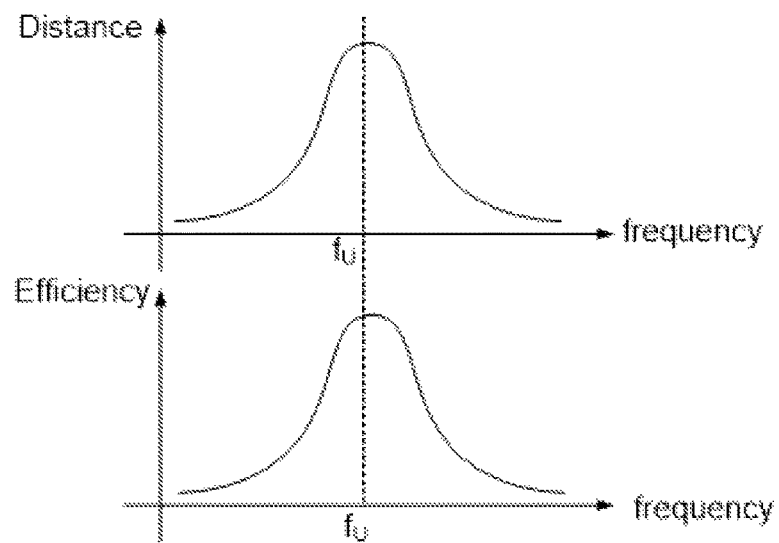
FIG. 14 illustrates the scenario where coupled resonant circuits having different resonant frequencies specified according to the present invention produce a unique oscillation frequency in a resonance-based wireless power transfer system.

Prior resonance-based wireless power transfer systems emphasize on the condition that the transmitter circuit and the receiver circuit resonate at the same frequency. However, as shown in FIG. 13, if a power transmitter and a power receiver have the same resonant frequency $f_0$, they tend to reach to one of three different stable oscillating states when coupled together: (1) oscillating at their original resonant frequency $f_0$, (2) oscillating at a frequency $f_L$ that is slightly lower than $f_0$, or (3) oscillating at a frequency $f_H$ that is slightly higher than $f_0$. It is difficult to predict and control which one of the three oscillating states the transmitter and receiver will reach to when they become coupled or when the distance between them changes. In fact, at frequency $f_0$, both the energy transfer efficiency and range degrade significantly. If a certain amount of frequency offset is introduced between the transmitter and the receiver, they may avoid the multi-oscillation-state situation and enter into a stable oscillation state at a unique frequency $f_U$. This is shown in FIG. 14, where the energy transfer efficiency at $f_U$ is high. The frequency offset needs to be between a lower bound and an upper bound to ensure that the coupled system will have only one oscillation frequency while maintaining high power transfer efficiency over varied distances. Particularly, the lower bound and upper bound of the ratio between the frequency offset and the average value of the transmitter's resonant frequency and the receiver's resonant frequency may be determined with the following formula:

$$\frac{1}{4}k^2 Q_2^2 - \frac{1}{2Q_2^2} < \frac{\Delta f}{f} < \frac{k^2 Q_2^2}{2},$$

where k is the mutual coupling coefficient between transmitter and receiver coils, $Q_2$ is the quality factor of the receiver, $\Delta f$ is the frequency offset, and $$f = \frac{1}{2}(f_1 + f_2),$$

where $f_1$ is the transmitter's resonant frequency and $f_2$ is the receiver's resonant frequency.

In designing a power receiver, when the material and the geometrical shape and size of the receiver's coil are specified, which is often the case in product design, engineers can pick and choose the receiver's capacitor to adjust the resonant frequency of the receiver so that the value of $$\frac{\Delta f}{f}$$

is set between the lower bound and the upper bound.

Figure 7:
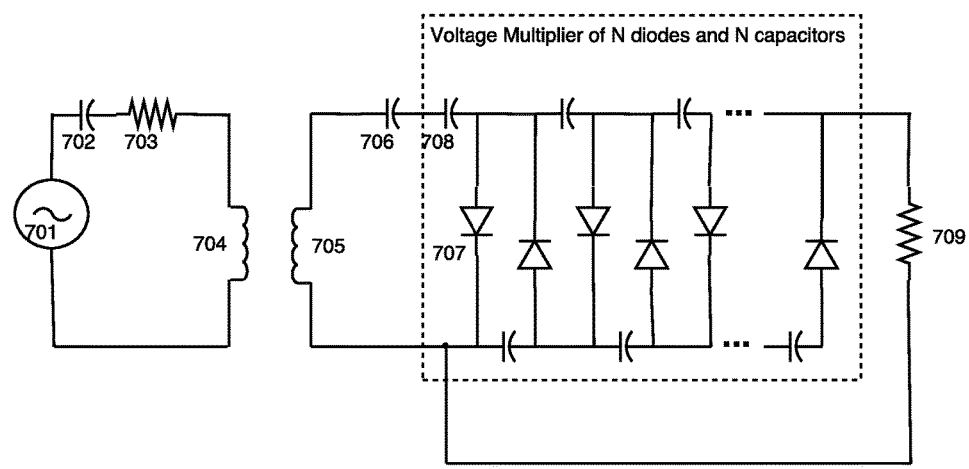
FIG. 7 is a circuit diagram of another example of the resonance-based wireless power transfer system, in accordance with one embodiment of the present invention.

FIG. 7 is a circuit diagram of another example of the resonance-based wireless power transfer system, in accordance with one embodiment of the present invention. Similar to FIG. 4, the power transmitter and the power receiver in FIG. 7 are all serial resonant circuits. However, instead of using a rectifier and a DC to DC converter, the power receiver in FIG. 7 uses a voltage multiplier of N diodes 707 and N capacitors 708. In case the resistance of the power load 709 is too large, the voltage multiplier circuit decreases the effective resistance of the power load 709, and therefore increasing the quality factor of the receiver circuit in FIG. 7.

Figure 8:
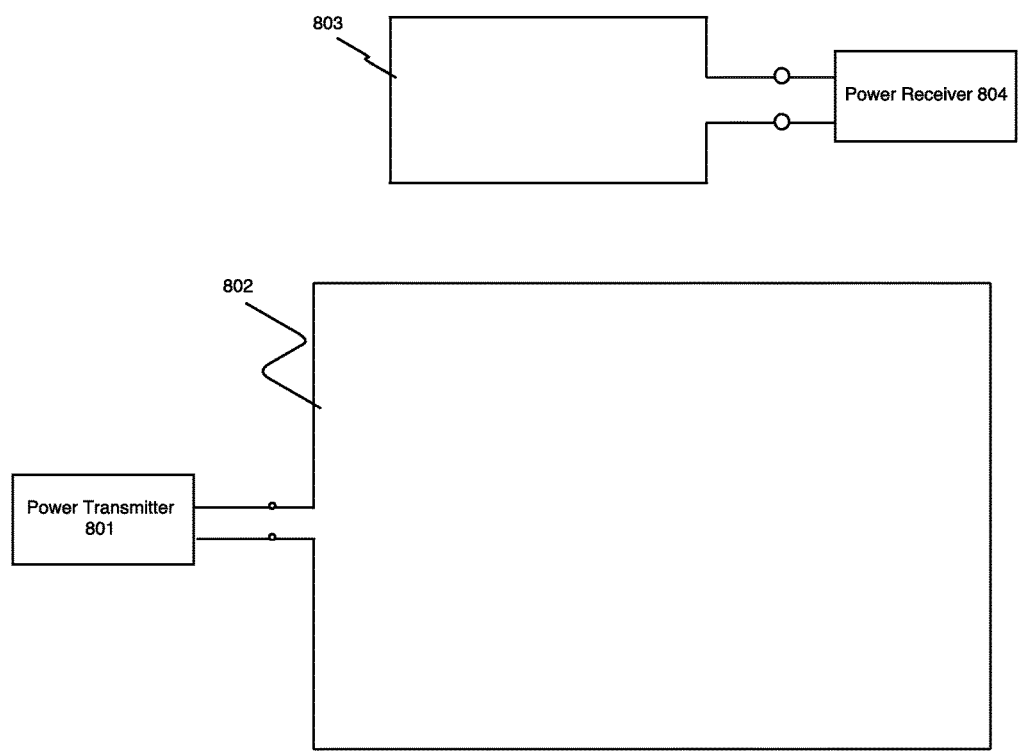
FIG. 8 illustrates an exemplary design of the coils of the resonance-based wireless power transfer system, in accordance with one embodiment of the present invention.
Figure 9:
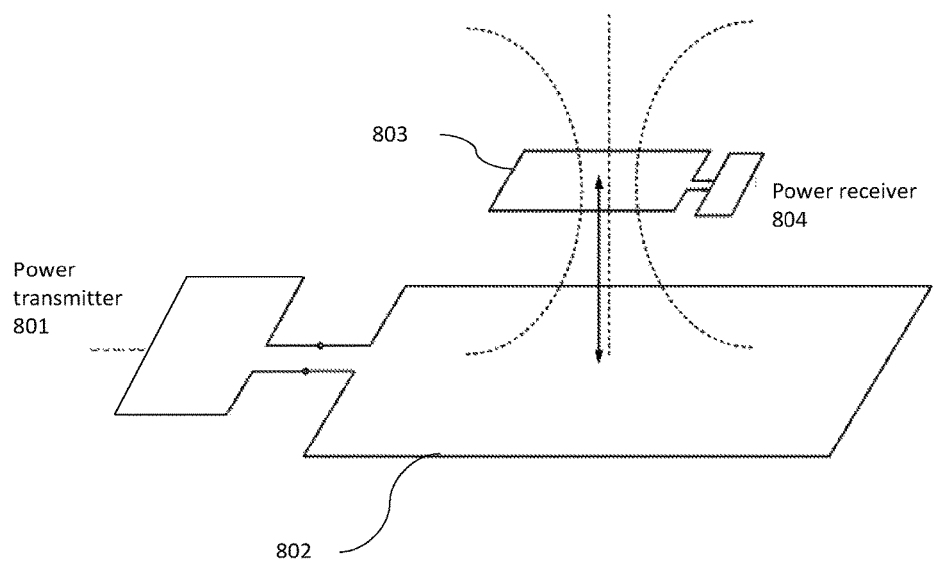
FIG. 9 illustrates a resonance-based wireless power transfer system that includes one power transmitter and one power receiver, in accordance with one embodiment of the present invention.

FIG. 8 illustrates an exemplary design of the coils of a resonance-based wireless power transfer system, in accordance with one embodiment of the present invention. As shown, the power receiver 804 includes a coil 803 that is shaped as a rectangle so that it may be formed along the edge a smartphone, a tablet computer, or a laptop computer or in a protective shell for any of the above devices. The coil 803 may include one or more turns depending on the need. The power transmitter 801 includes a coil 802 that is also shaped as a rectangle. Of course, the coils may be formed into other shapes as well, including but not limited to circle, square, and hexagon. In addition, the transmitter coil 802 covers a much larger area than the receiver coil 803 does. In other words, the geometrical size of the transmitter coil 802 is much larger than that of the receiver coil 803. Such design allows the receiver coil 803 to move freely within the larger area covered by the transmitter coil 802 during operation. In one embodiment, the transmitter coil 802 is installed underneath a desk. When a smartphone user sits next to the desk and holds out the smartphone above the desk surface, as long as the smartphone is positioned within the area covered by the transmitter coil, the receiver coil connected to or integrated inside the smartphone will be able to couple with the transmitter coil and therefore getting wirelessly charged. This design provides a much higher degree of freedom, flexibility and convenience to users. FIG. 9 illustrates such a scenario where the power transmitter's coil and the power receiver's coil shown in FIG. 8 are coupled together during a wireless charging session.

Figure 10:
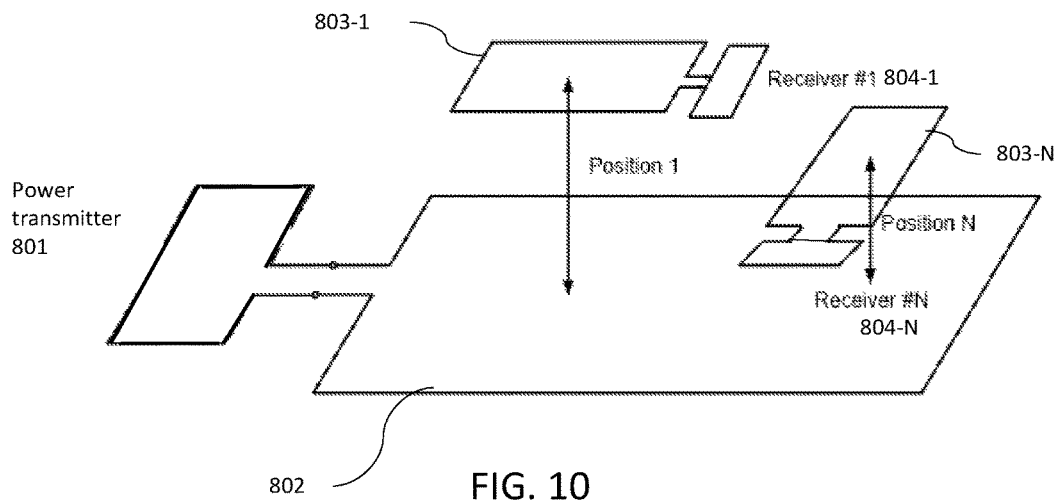
FIG. 10 illustrates a resonance-based wireless power transfer system that includes one power transmitter and multiple power receivers, in accordance with one embodiment of the present invention.

Another benefit from designing the transmitter coil substantially larger than the receiver coil is that the transmitter may simultaneously support multiple receivers. For example, FIG. 10 illustrates a resonance-based wireless power transfer system that includes one power transmitter and multiple power receivers, in accordance with one embodiment of the present invention. As shown, the power transmitter 801 includes a large coil 802, which can simultaneously couple with multiple receiver coils 803-1 to 803-N. Thus, referring back to the above smartphone example, multiple smartphone users may sit or stand next to the desk to simultaneously charge their smartphones. This application is very useful in an airport or a public place where one charging base can serve multiple users at the same time.

Figure 11:
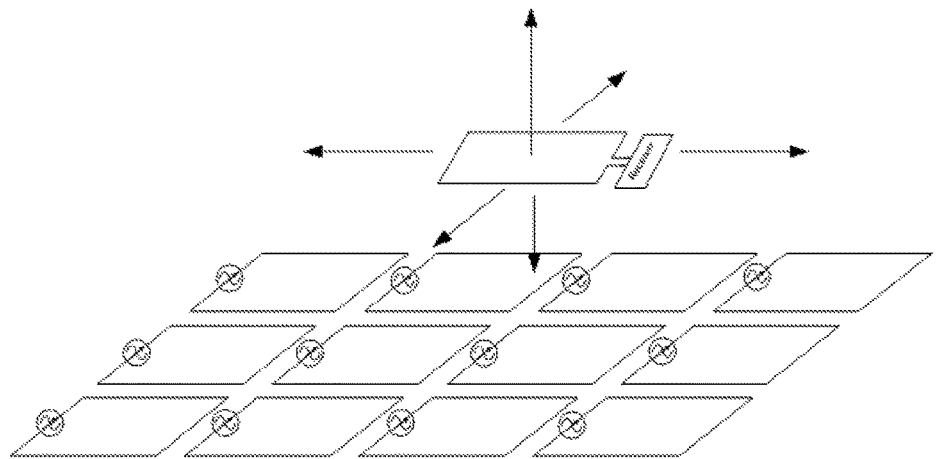
FIG. 11 illustrates a resonance-based wireless power transfer system that includes multiple power transmitters and one power receiver, in accordance with one embodiment of the present invention.
Figure 12:
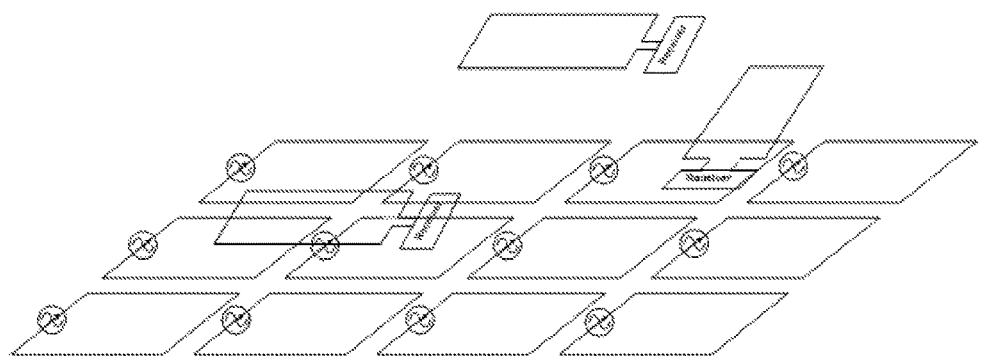
FIG. 12 illustrates a resonance-based wireless power transfer system that includes multiple power transmitters and multiple power receivers, in accordance with one embodiment of the present invention.

However, there is a limit on how large or small a transmitter coil can be made. If it is too large, the magnetic energy will be too weak for efficient power transfer. However, if it is too small the effective charging distance will be reduced by the fluctuating coupling coefficient between the coils. In one embodiment, the ratio between the geometrical size of a transmitter coil and the geometrical size of a receiver's coil is set between 2 to 4. To further expand the effective charging area, multiple power transmitters such as the one shown in FIG. 3, 4 or 7 are arranged together as an array, for example, to cover a large space (e.g., a large desk, a warehouse floor, a road). As such, one or more power receivers such as the one shown in FIG. 3, 4 or 7 can freely move within the effective charging area while getting charged continuously. Because two opposing magnetic fields may cancel out each other, in one embodiment, each two adjacent power transmitters in the array are spaced far enough to avoid such negative effect. Alternatively, the oscillation phases of the plurality of power transmitters are synchronized so that their magnetic fields are always aligned to the same direction. As such, the power transmitters may be placed close enough without canceling out each other's magnetic fields. For example, FIG. 11 illustrates a resonance-based wireless power transfer system that includes multiple power transmitters and one power receiver. And FIG. 12 illustrates a resonance-based wireless power transfer system that includes multiple power transmitters and multiple power receivers. Such an arrangement is very useful in the field of mobile robot. Traditionally, a mobile robot needs to return to a charging base periodically to replenish its battery. With the present invention, a mobile robot having such a power receiver can freely navigate within the large area while being charged by one of these transmitters. Thus, the mobile robot does not have to return to a charging base when its battery power is low, substantially reducing the mobile robot's down time.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:
1. A wireless power transfer system, comprising:
a power transmitter comprising a first capacitor and a first coil, the power transmitter having a first resonant frequency $f_1$; and
a power receiver comprising a second capacitor and a second coil, the power receiver having a second resonant frequency $f_2$;
wherein the first resonant frequency is different from the second resonant frequency, and a frequency difference between the first resonant frequency $f_1$ and the second resonant frequency $f_2$ is given by $\Delta f$, wherein the frequency difference $\Delta f$ is set such that

$$\frac{1}{4}k^2 Q_2^2 - \frac{1}{2Q_2^2} < \frac{\Delta f}{f} < \frac{k^2 Q_2^2}{2},$$

where k is a mutual coupling coefficient between the first coil and the second coil, $Q_2$ is a quality factor of the power receiver, and $$f = \frac{1}{2}(f_1 + f_2),$$

in order to ensure that when coupled together the power transmitter and the power receiver can oscillate together at only one oscillating frequency.

2. The wireless power transfer system of claim 1, wherein the second capacitor and the second coil form a parallel LC circuit, and wherein the power receiver further comprises a rectifier and a DC to DC converter.

3. The wireless power transfer system of claim 1, wherein the second capacitor and the second coil form a serial LC circuit, and the power receiver further comprises an AC to DC converter.

4. The wireless power transfer system of claim 1, wherein the second capacitor and the second coil form a serial LC circuit, and the power receiver further comprises a voltage multiplier having a plurality of diodes and a plurality of capacitors.

5. The wireless power transfer system of claim 1, wherein the power transmitter further comprises a power source.

6. The wireless power transfer system of claim 1, wherein the ratio between the first coil's area and the second coil's area is between 2 and 4.

7. The wireless power transfer system of claim 6, wherein the first coil is of a rectangle, square, circle, or hexagon shape and the second coil is of a rectangle, square, circle, or hexagon shape.

8. The wireless power transfer system of claim 1, further comprising:
a second power receiver comprising a third capacitor and a third coil, the second power receiver having a third resonant frequency $f_3$;
wherein the first resonant frequency is different from the third resonant frequency, and a frequency difference between the first resonant frequency $f_1$ and the third resonant frequency $f_3$ is given by $\Delta f_{13}$, wherein the frequency difference $\Delta f_{13}$ is set such that $$\frac{1}{4}k_{13}^2 Q_3^2 - \frac{1}{2Q_3^2} < \frac{\Delta f_{13}}{f_{13}} < \frac{k_{13}^2 Q_3^2}{2},$$

where $k_{13}$ is a mutual coupling coefficient between the first coil and the third coil, $Q_3$ is a quality factor of the second power receiver, and $$f_{13} = \frac{1}{2}(f_1 + f_3),$$

in order to ensure that when coupled together the power transmitter and the second power receiver can oscillate together at only one oscillating frequency.

9. A wireless power transfer system, comprising:
a resonant power transmitter comprising a transmitter coil, the resonant power transmitter having a first resonant frequency $f_1$; and
a plurality of resonant power receivers each comprising a respective receiver coil, each resonant power receiver having a respective second resonant frequency f2;
wherein each respective second resonant frequency is different from the first resonant frequency, and a respective frequency offset between the first resonant frequency $f_1$ and each respective second resonant frequency $f_2$ is given by $\Delta f$, wherein the respective frequency offset $\Delta f$ is set such that $$\frac{1}{4}k^2 Q_2^2 - \frac{1}{2Q_2^2} < \frac{\Delta f}{f} < \frac{k^2 Q_2^2}{2},$$

where k is a mutual coupling coefficient between the transmitter coil and the respective receiver coil, $Q_2$ is a quality factor of the respective resonant power receiver, and $$f = \frac{1}{2}(f_1 + f_2),$$

in order to ensure that when coupled together the resonant power transmitter and each power receiver can oscillate together at only one oscillating frequency.

10. The wireless power transfer system of claim 9, wherein at least one of the plurality of resonant power receivers comprises a parallel LC circuit, a rectifier, and a DC to DC converter.

11. The wireless power transfer system of claim 9, wherein at least one of the plurality of resonant power receivers comprises a serial LC circuit and an AC to DC converter.

12. The wireless power transfer system of claim 9, wherein at least one of the plurality of resonant power receivers comprises a serial LC circuit and a voltage multiplier having a plurality of diodes and a plurality of capacitors.

13. A wireless power transfer system, comprising:
a resonant power receiver comprising a receiver coil, the resonant power receiver having a first resonant frequency $f_1$; and
a plurality of resonant power transmitters each comprising a respective transmitter coil, each resonant power transmitter having a respective second resonant frequency $f_2$;
wherein each respective second resonant frequency is different from the first resonant frequency, and a respective frequency offset between the first resonant frequency $f_1$ and each respective second resonant frequency $f_2$ is given by $\Delta f$, wherein the respective frequency offset $\Delta f$ is set such that $$\frac{1}{4}k^2 Q_2^2 - \frac{1}{2Q_2^2} < \frac{\Delta f}{f} < \frac{k^2 Q_2^2}{2},$$

where k is a mutual coupling coefficient between the receiver coil and the respective transmitter coil, $Q_2$ is a quality factor of the respective resonant power receiver, and $$f = \frac{1}{2}(f_1 + f_2),$$

in order to ensure that when coupled together the resonant power receiver and each resonant power transmitter can oscillate together at only one oscillating frequency.

14. The wireless power transfer system of claim 13, wherein the plurality of resonant power transmitters is synchronized so that their magnetic fields are always aligned to the same direction.

15. The wireless power transfer system of claim 14, wherein the resonant power receiver comprises a parallel LC circuit, a rectifier, and a DC to DC converter.

16. The wireless power transfer system of claim 14, wherein the resonant power receiver comprises a serial LC circuit and a voltage multiplier having a plurality of diodes and a plurality of capacitors.

* * * * *